Aug. 15, 1933.　　　　I. WEISS　　　　1,922,267

RUMBLE SEAT TOP

Filed July 15, 1932　　　2 Sheets-Sheet 1

Inventor
IKE WEISS,
By R. Peale Herrick
Attorney

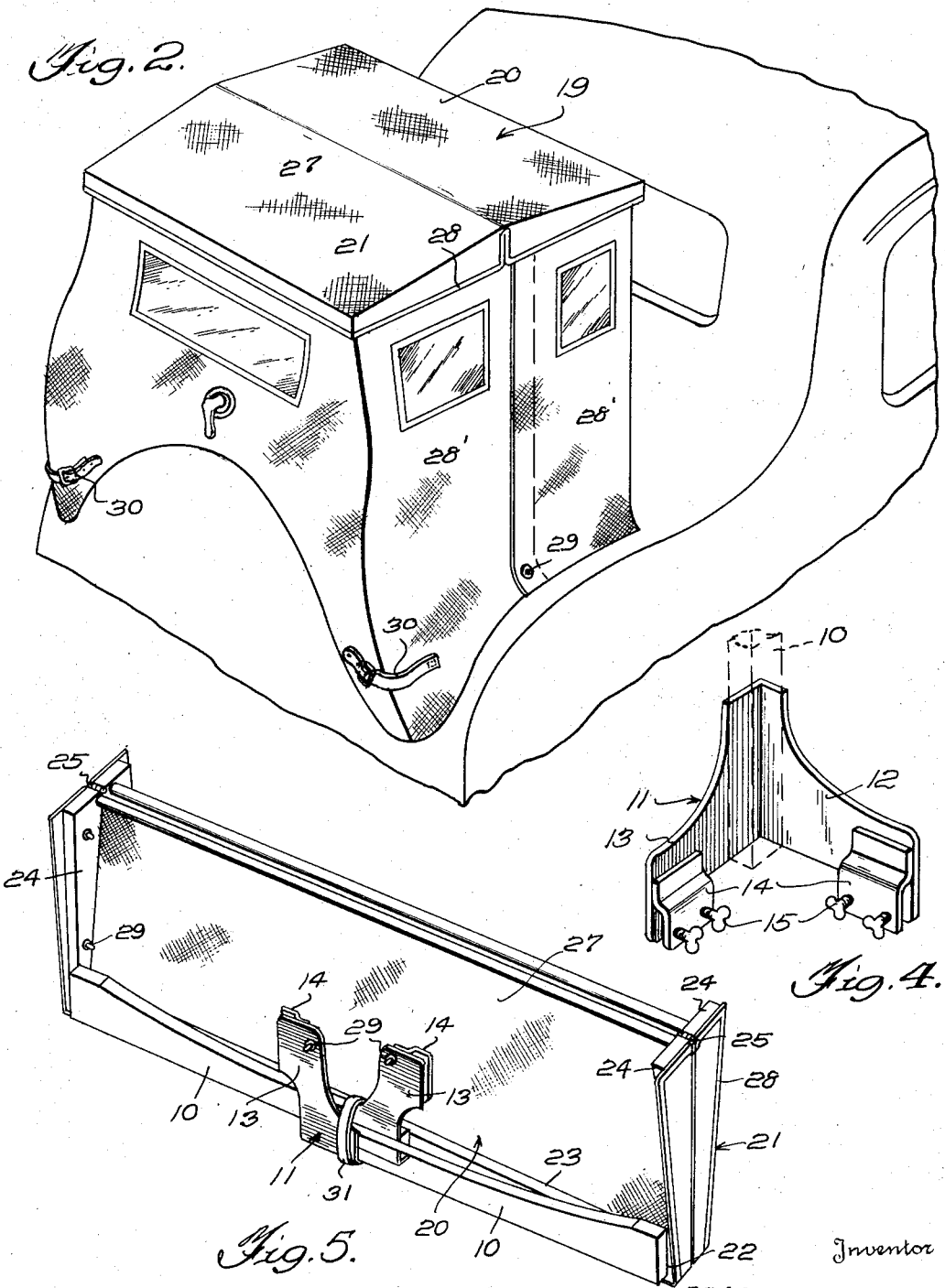

Patented Aug. 15, 1933

1,922,267

UNITED STATES PATENT OFFICE 1,922,267

RUMBLE SEAT TOP

Ike Weiss, Brooklyn, N. Y.

Application July 15, 1932. Serial No. 622,737

2 Claims. (Cl. 296—99)

This invention relates to an improvement in detachable and collapsible tops or canopies for the rumble seats of motor vehicles.

It is an object of the present invention to provide a top for rumble seats that may be quickly and conveniently attached without in any way altering the vehicle and, when in position affords a relatively rigid cover for the occupants of the seat.

A further object is the provision of a top so constructed as to permit a section thereof being folded forwardly for permitting the entry of sunlight and further to expedite the entry of the passengers to and from the seat.

Another and important object of the invention resides in the extreme simplicity of the top, embodying few and simple parts requiring no tools for mounting, is unusually strong, durable and highly convenient in use.

Other important objects and advantages of the invention will be apparent during the course of the following description, reference being had to the accompanying drawings.

In the drawings,

Figure 2 is a similar view with enclosing storm curtains attached,

Figure 4 is a perspective view of one corner attaching bracket, and,

Figure 5 is a perspective view of the top in detached and collapsed position.

Figure 1:
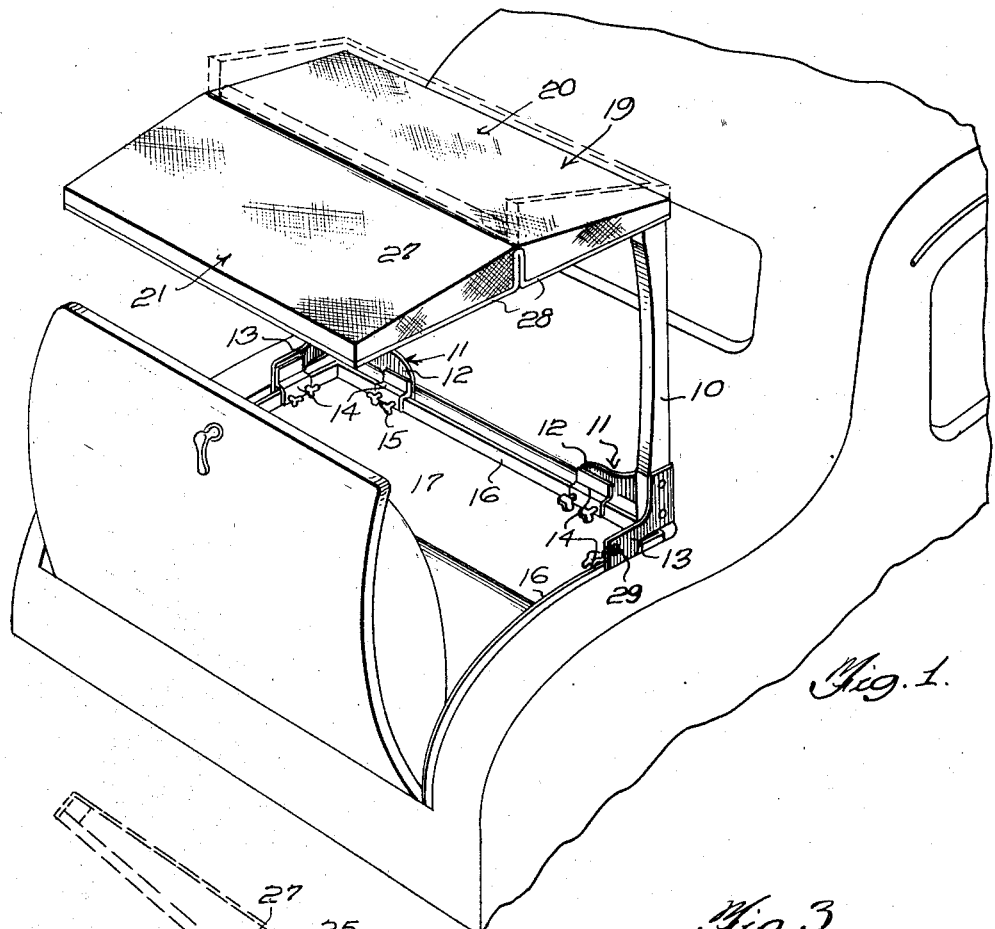
Figure 1 is a perspective view of the device in use upon a motor vehicle.

Referring specifically to the drawings the numeral 10 designates a pair of standards or supports, carrying at their lower ends a pair of brackets 11 of right angle formation. One leg 12 of each bracket extends inwardly toward the opposite bracket, while the other end or leg 13 extends rearwardly, parallel with each other. The brackets 11 are provided with fixed spaced plates 14 on the inner side of each leg, and carry set screws 15. The brackets just described are adapted to engage over and clamp upon the flange 16 of the water trough of the rumble seat opening 17 of the vehicle, and as shown, the legs 12 and 13 engage the inner sides of the flange 16 and are clamped thereto by the set screws 15. Obviously this provides a very simple and quickly attachable means for the supports of the top.

The standards 10 support at their upper ends a top structure designated as a whole by the numeral 19, and embodying identical sections 20 and 21. The section 20, as shown, has connection with the standards 10 through the medium of hinge joints 22, and when in position, these joints are held in rigid position due to the rigid connection of the brackets 11. Each top section 20 and 21 comprises a substantially rigid rectangular frame composed of side members 23 and end members 24. The end members 24 of each section decrease in width toward their outer ends for providing an inclined upper surface, and these end members are hingedly joined at their abutting ends, as at 25. It will be observed that the abutting ends of the members 24 are relatively wide. Each section 20 and 21 is further provided with a rigid connecting bar adjacent the abutting ends of the members 24, and these bars are connected with the end members adjacent the joint 25, thus providing in effect a ridge support that extends transversely of the top.

A flexible waterproof cover 27 is positioned over the entire top, and is suitably attached to the frame members 23 and 24 by the usual binding material 28. The cover 27 entirely covers and slightly depends below the frame members where it is bound upon its edges to give it a finished appearance. The cover 27 adjacent the joint 25 is cut and bound to permit breaking of the joint.

Figure 3:
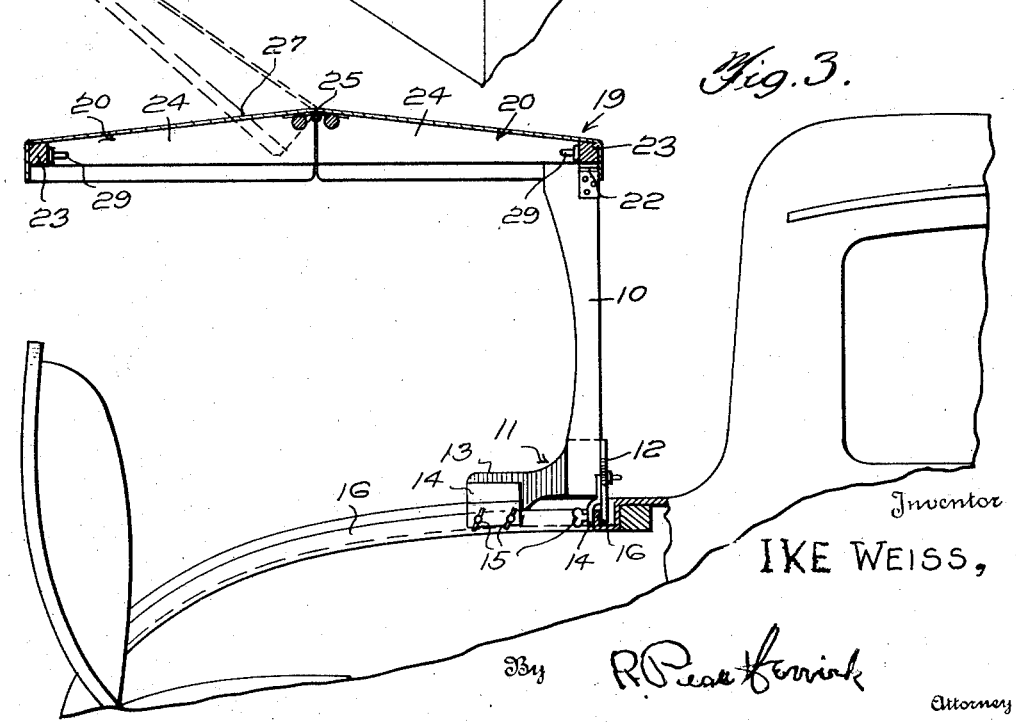
Figure 3 is a longitudinal section through the device in attached position.

The purpose in providing the joint 25 is to permit of the folding forwardly of the section 21 over the section 20. The top 19 with its frames and connections are made sufficiently rigid to be supported in overhanging position entirely by the standards 10. The positioning of the ridge bars will insure of the cover material 27 being held in a position of incline both ways from the transverse center of the top, to afford proper drainage. As shown in Figure 3, the cover 27, being taut, will hold the section 21 in extended position, due to a slight past center pull exerted by the cover, and this plus the pressure exerted by the wind will insure of the section 21 being held in extended position until shifted manually upwardly.

A slight upward push upon the section 21 will be sufficient to break the joint 25, and a continued upward push will result in the section 21 swinging about the joint 25 and lying upon the section 20, in which position it will remain until shifted manually to extended position. This position will permit of the entry of sunlight, and further will expedite the ingress and egress of the occupants of the rumble seat.

As shown in Figure 2, suitable storm curtains may be employed for enclosing the occupants of the car. The curtains embody a plurality of sections of flexible waterproof material 28, having the usual celluloid lights therein. As shown, the curtains at their lower edges snugly fit the contour of the body of the vehicle, and are adequately held in place at their upper edges by conventional separable fasteners 29 carried by the inner sides of the frame pieces 23 and 24, and similar fasteners are carried by the legs of the brackets 11. After the curtains 28 have been suitably connected to the fasteners, straps 30 carried by the rear section 28 are drawn tight, such action causing the lower edges of the curtains to snugly fit against the body of the vehicle.

When the top is detached, it is desirable that it be collapsed for convenience in handling or storing. Figure 5 illustrates the device in its collapsed position, and from this figure it will be seen that the sections 20 and 21 are folded upon each other, while the standards 10 are folded inwardly upon their hinges 22, the whole providing a relatively small rectangular form. A strap 31 carried by one member 24 serves to bind the standards in collapsed position. The storm curtains 28 may be folded and placed within the frame, these being omitted in this figure for sake of clearness. The structure as a whole may then be placed in a suitable waterproof bag or covering.

It will be seen from the foregoing that an extremely simple and compact top has been provided. The structure embodies no parts that are likely to become disarranged, and are of such nature as to permit of its ready attachment to various types of conventional rumble seats without in any way altering the structure of either the vehicle or the top. The storm curtains may vary slightly in shape to fit the different contours of various makes of vehicles.

It is to be understood that the invention is not limited to the precise form illustrated, but that various changes in the shape size and arrangement of parts may be resorted to without departing from the spirit of the invention or the scope of the subjoined claims.

Having described my invention, what I claim is:

1. A collapsible rumble seat top of the character described for motor vehicles comprising a pair of identical top sections embodying substantially rectangular frames having abutting edges, said frames inclined downwardly from their abutting edges, hinge means connecting the frames at their abutting edges, a single sheet of fabric covering said frames and secured thereto, ridge bars carried by each frame section adjacent its abutting edge for supporting the fabric in ridge form, a pair of supporting standards hingedly connected at opposite corners to one of said frame sections, means for rigidly and detachably connecting said standards to the vehicle, said top sections, supporting standards and connecting means adapted to be collapsed into a compact form.

2. In combination a motor vehicle having a rumble seat and a rumble seat opening, said opening having a water trough extending therearound, a collapsible top for said seat, a pair of supporting standards for said top, means for rigidly and detachably connecting said standards at the forward corners of the opening, said means comprising an L-shaped bracket for each standard, the arms of said brackets adapted to engage in the said water trough, offset plates rigidly connected with each arm and positioned outwardly of said water trough and set screws carried by each plate and adapted to engage a flange of said trough, substantially as shown and described.

IKE WEISS.